United States Patent Office 2,803,647
Patented Aug. 20, 1957

2,803,647

PREPARATION OF CARVEOL AND DIHYDRO-CARVEOL AND THEIR ESTERS

Joseph P. Bain, Albert B. Booth, and Eugene A. Klein, Jacksonville, Fla., assignors to The Glidden Company, Cleveland, Ohio, a corporation of Ohio No Drawing. Application July 15, 1953, Serial No. 368,209

16 Claims. (Cl. 260—489)

The present invention relates to the preparation of carveol and dihydrocarveol and their esters.

The esters of dihydrocarveol are recognized constituents of such essential oils as spearmint and caraway, which are of considerable economic importance. They also occur as constituents of many other less widely known oils. Carvyl acetate is recognized as possessing an intense spearmint odor. Carveol and dihydrocarveol are also readily converted to their respective ketones in good yield by the well-known Beckmann oxidation. These ketones, especially carvone, occur to the extent of 60% and more in the above-mentioned oil. Dihydrocarvone occurs to a lesser extent.

Because of the importance of these flavor and odor chemicals, it is desirable to be able to prepare them from readily available raw materials, thereby achieving a more dependable and economic supply than from the naturally-occurring essential oils.

It is accordingly an object of the present invention to provide a process for preparing carveol, dihydrocarveol and their esters.

Another object of the invention is to provide a process for preparing carveol and dihydrocarveol and their esters from intermediates obtainable from α-pinene, a constituent of turpentine.

Other objects will be apparent to those skilled in the art.

Sobrerol, 1-p-menthene-6,8-diol, is available from the hydration of α-pinene epoxide which in turn can be prepared from α-pinene, for example, by the known method of preparing epoxides from olefins by reacting them with perbenzoic acid. To convert sobrerol to carveol, it is necessary to dehydrate in such a way that the components of water are split out between the 8- and 9-carbon atoms, leaving an unsaturation there, but at the same time preserving the sensitive 6-hydroxyl group, which is part of an allylic system and therefore loosely bound. The usual methods of dehydrating a tertiary alcohol fail with sobrerol since it has a great tendency to pass either to the ether, pinol, or to hydrocarbons, ultimately cymene. These facts are well known to the art. Pyrolysis of sobrerol might seem a likely method, but it leads to hydrocarbons and some pinol. Likewise, one might assume that on careful heating the boric ester, the preparation of which proceeds simply and clearly, would dehydrate at the tertiary position. Such treatment again results in the formation of hydrocarbons and pinol.

We have found, however, that if the diacetate or other diester of sobrerol is pyrolyzed under mild conditions, then the tertiary 8-acyloxy group is split off in the desired manner and the secondary acyloxy group for the most part survives. Thus, the pyrolysis of sobrerol diacetate leads to carvyl acetate in good yield. Dihydrosobreryl acetate behaves similarly giving dihydrocarvyl acetate in even better yield, since the secondary acetoxy group is not so sensitive in this case, due to lack of allylic unsaturation.

The reactions are illustrated by the following equations:

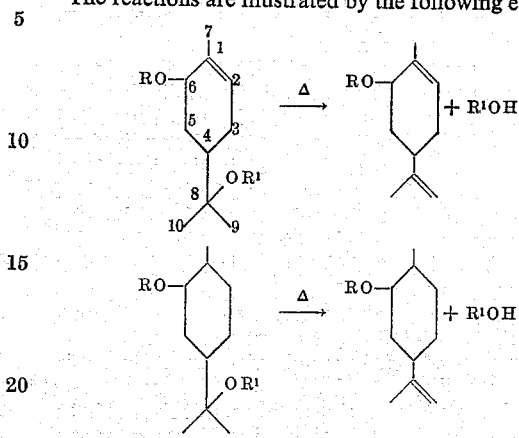

in which R and $R^1$ are carboxylic acid radicals. Although any suitable carboxylic ester of sobrerol or dihydrosobrerol can be used, it is evident that the use of the diacetate is most advantageous since it is easily prepared from sobrerol or hydrogenated sobrerols and the cheap and readily available acetic anhydride in excellent yield. Even where another ester of carveol or dihydrocarveol, such as the isovalerate, is the desired end product, it may be most economical to prepare and pyrolyze the diacetate and then prepare the other ester from the acetate by known ester exchange reactions and methods. However, some cases may occur where it will be desirable to pyrolyze an ester other than the acetate.

The pyrolysis is most simply carried out in the liquid phase and most conveniently at the reflux temperature. It may also be carried out in the vapor phase. In general, lower pyrolysis temperatures will require a longer time and higher pyrolysis temperatures a shorter time. Milder conditions are to be preferred from the standpoint of yield. The most desirable operating conditions for plant manufacture will be determined by balancing the yield against the processing time required, as is usual in chemical economics.

Broadly, an important feature of our invention consists of suitably protecting the secondary 6-hydroxy group while the tertiary hydroxy group at the 8-position is being converted to an 8-9 double bond and without permitting substantial loss of the 6-oxygenated substituent, formation of pinol or other undesirable reaction.

We prefer, in general, to employ sufficient acylating agent to react with both hydroxyl groups of the sobrerol or dihydrosobrerol though somewhat less than two mols acylating agent per mol of glycol can be employed. In general, however, too little acylating agent tends to permit formation of the inner ether between the 6- and 8-carbon atoms and tends to cause loss of sobrerol in other ways such as conversion to cymene. Since excess acylating agent such as acetic anhydride can be readily recovered from the pyrolysis mixture, it is safer and not expensive to employ more than is required for the stoichiometric formation of the diester.

The following examples are illustrative in our invention.

*Example 1*

Sobrerol, 2364 g., 14 moles, and acetic anhydride, 3135 g., were refluxed for one hour (pot temperature approximately 160° C.). The mixture was then concentrated by distillation of acetic acid and anhydride at approximately 150 mm., absolute pressure, to a pot temperature of 150° C. The residue was refluxed at atmospheric pressure, 162–205° C., for 15 hours. An infrared absorption spectrum on the final reaction mixture after removal of acetic acid by washing showed very little unreacted sobrerol acetate, small amounts of aromatic and conjugated, carbon to carbon, compounds, and a good yield of carveol acetate.

The reaction mixture was fractionated through an efficient Stedman type column at about 150 mm., absolute pressure, to a pot temperature of 150° C. The pressure was then reduced to 10 mm., and the distillation continued to a pot temperature of 170° C., and then to 1–2 mm., to a pot temperature of 200° C. Forty-six fractions were collected and these varied in size from 14 to 102 grams. Infrared spectra were made for several of the fractions and these showed the number of major compounds, as well as their structure. The following compounds in order of their increasing boiling points were found to be present:

(A) Acetic acid was the major component of the material boiling at 68–73° C., at about 150 mm.

(B) Cymene and 1,5,8-p-menthatriene were present in the fractions boiling at 56–60° C., at 10 mm. The presence of cymene was shown by comparison of the spectra of the fractions containing it with the spectrum of a known sample of pure material. The 1,5,8-menthatriene was identified by spectrochemical methods which indicated it to possess a tertiary ethylene linkage, a symmetrically disubstituted ethylene linkage, an isopropenyl methylene linkage, and also that the first two ethylenic linkages were conjugated. It showed $$\lambda_{max} 265 m\mu, \alpha = E_{1cm}^{g/l.} = 30.8$$

(C) Pinol was the major compound boiling at 63–72° C., at 10 mm. The presence of the compound was shown by comparison of the spectra of the fractions with the spectrum of a standard sample.

(D) Trans-carveol acetate, $n_D^{25}$ 1.4741, $d^{25}$ 0.965, comprised the material boiling at 86° C., at 2 mm. It was identified and characterized as follows:

(1) Saponification of the ester with a 35% sodium hydroxide solution yielded cis-carveol ($n_D^{25}$ 1.4970, $d^{25}$ 0.950) which was subsequently oxidized to carvone by the Beckmann procedure.

(2) The ester had an intense spearmint odor.

(3) The major infrared absorption bands were at these wavelengths ($\mu$): 5.75, 6.05, 6.9, 7.27, 8.05, 9.78, 10.3, 10.8, 11.25, 12.3.

(E) Sobrerol acetate was the major component of the fractions boiling at 104–106° C./1 mm. It was identified by comparison of its spectrum with the spectrum of a standard sample.

(F) An unidentified hydrocarbon was the principal product of the fractions boiling at 130–140° C./1 mm. From its infrared spectrum the following points were determined concerning its structure:

(1) The major absorption bands were at these wavelengths ($\mu$): 6.1, 6.63, 6.92, 7.3, 8.05, 9.55, 9.8, 11.27, 12.23, 13.42, 13.76.

(2) The entire spectrum is very similar to that of p-cymene.

(3) The absorption at the following wavelengths ($\mu$) represent the indicated structural features of the molecule:

6.1 and 11.27$\mu$, a $CH_2=C<$ group
6.63 and 12.23$\mu$, an aromatic nucleus

Analytical data on the fractions resulting from distillation showed that the acetylated sobrerol pyrolysis product possessed the following approximate composition (the yields are expressed on a molar basis compared to the starting sobrerol):

|  | Moles | Yield, percent |
|---|---|---|
| Cymene+1,5,8-p-menthatriene | 1.45 | 10.3 |
| Pinol | 1.20 | 8.6 |
| trans-Carveol acetate | 5.65 | 40.5 |
| cis-Carveol acetate | 2.62 | 19.0 |
| Sobrerol acetate | 0.40 | 2.9 |
| Unidentified hydrocarbon | 0.36 | 2.5 |
| Distillation residue | 0.05 | 0.2 |
| Loss+unaccounted for | 2.27 | 16.0 |
|  | 14.00 | 100.0 |

*Example 2*

Sobrerol acetate was pyrolyzed in the vapor phase by adding the material dropwise down the side of a heated standard ¼″ iron pipe, the temperature of which was determined from a thermocouple inserted down the center of the pipe. Infrared spectrophotometric analyses were run on the reaction mixtures and these indicated the number of major products as well as their approximate yields. The results of these experiments are tabulated below:

| Temp., ° C. | Rate, cc./min. | Carveol Acetate | Sobrerol Acetate | Hydrocarbons |
|---|---|---|---|---|
|  |  | Percent | Percent | Percent |
| 310 | 2–3 | 50 | 30 | 20 |
| 400 | 2–3 | 15 | 5 | 80 |

The yields are expressed as percentages by weight of total reaction mixtures after freeing them of acetic acid.

*Example 3*

Sobrerol diacetate was prepared by refluxing 166 g. of sobrerol with 244 g. of acetic anhydride. The acetylation is very fast under these conditions. The initial boiling point of the mixture was 140.5° C., but on continued refluxing, the boiling point had dropped to 135° over a period of 7 hours. Thus, even refluxing the sobrerol ester under these mild conditions results in cleavage to carveol acetate.

This mixture was then fractionated under vacuum, recovering acetic acid and excess acetic anhydride, a little pinol and hydrocarbon, and 60 g. carvyl acetate, B. P. 110° C., at 10 mm., which formed during the refluxing period. This was followed by 120 g. of sobrerol diacetate, B. P. 146–147° C., at 10 mm., and 15 g. of residue which was practically all sobrerol diacetate.

Eighty-six grams of the pure distilled sobrerol diacetate was then refluxed at atmospheric pressure until the temperature in the pot fell to 159° C. The still pot in which this pyrolysis was carried out was fitted with a column and the temperature at the top of the column fell from 118 to 114° as the decomposition proceeded. Part of the acetic acid may be distilled off during the pyrolysis if it is desired to raise the pot temperature; however, this was not done in this case.

The contents of the pot were then washed with water to remove the acetic acid and fractionated. Fractionation showed:

| | Percent |
|---|---|
| Low boiling products | 12 |
| Carvyl acetate | 65 |
| Unreacted sobrerol diacetate | 17 |
| Loss on distillation | 6 |

Thirty grams of the carvyl acetate so produced was refluxed one hour with 100 cc. methanol and 15 g. potassium hydroxide. This mixture was then poured into water, the oil extracted with light petroleum and the petroleum evaporated off under vacuum. The identity of the carveol was established by comparing the infrared absorption spectrum of the carveol so produced with that of an authentic specimen produced by reduction of carvone from caraway oil.

A few grams of this carveol was oxidized with sodium dichromate and sulfuric acid in the known manner to convert it to carvone. The carvone so prepared possessed the characteristic carvone odor and its infrared spectrogram was the same as that of carvone from caraway oil, thus establishing its identity.

The carveol prepared by the pyrolysis of sobrerol diacetate is a mixture of cis- and trans-isomers, as is the carveol prepared from carvone by Meerwein-Ponndorf reduction.

*Example 4*

One-hundred and seventy grams of sobrerol was heated to reflux with 380 g. of butyric anhydride and 2 g. of sodium carbonate. As with the acetate, the pot temperature fell slowly on prolonged refluxing. Refluxing was stopped when the pot temperature had fallen to 161° C. from an initial 180° C. This was later found to have been an excessively long decomposition period for the temperature employed. The mixture was then cooled, stirred with water and neutralized with sodium carbonate. The infrared spectrogram showed a considerable amount of an ester having a terminal methylene group. On distillation, carvyl butyrate was recovered ($b_{1.5}$ 93° C.) in somewhat poorer yield than the acetate in Example 1.

*Example 5*

One-hundred and fifty grams of mixed carvyl acetates prepared by the pyrolysis of sobrerol acetate were mixed with 100 g. methyl isovalerate, 8 g. of sodium methylate and 200 g. toluene. The mixture was slowly distilled at atmospheric pressure, fractionating off the methyl acetate formed by exchange and continuing the distillation until the head temperature rose to 107° C. A total of 63.5 g. of distillate, mostly methyl acetate, but some toluene, was collected. The crude toluene solution of carvyl isovalerate was then distilled under high vacuum without a fractionating column to recover in excellent yield the pure mixed carvyl isovalerates, boiling at about 90° C., under about 0.6 mm. pressure.

*Example 6*

Nineteen grams of recrystallized sobrerol was dissolved in 100 cc. methanol and hydrogenated at room temperature with 0.2 g. platinum oxide under a hydrogen pressure of 50 p. s. i. g. max. The hydrogenation was complete in 10 minutes. The catalyst was filtered off and the methanol evaporated, leaving crystals of dihydro sobrerol and a small amount of oil. The oil was separated from the crystals by washing with naphtha, in which dihydro sobrerol is but little soluble. On evaporation of the naphtha, the oil was recovered and identified as dihydro-α-terpineol and must have been formed by hydrogenolysis.

Fifteen grams of the dihydro sobrerol freed of dihydro-α-terpineol was refluxed with 22 g. acetic anhydride and one gram of sodium acetate. On prolonged refluxing the pot temperature underwent a slow fall, as with sobrerol acetate. An infrared spectrogram taken of the mixture after washing out the acid showed some ester present which contained a terminal methylene group.

Ten grams of the crude dihydrosobreryl acetate containing some dihydrocarvyl acetate was refluxed at atmospheric pressure to pyrolyze off the 8-acetoxy group. Refluxing was stopped when the pot temperature had dropped to 164° C. from an initial 220° C. After washing out the acid, the oil remaining was examined by infrared spectrophotometric methods. Based on the density of the methylene and acetoxyl absorptions, the oil consisted very largely of dihydrocarvyl acetate. This crude dihydrocarvyl acetate showed $\alpha_D^{25} +39°$ (10 cm. tube) starting from sobrerol $[\alpha]_D -107.5°$.

Five and five-tenths grams of this dihydrocarvyl acetate was refluxed for one hour with 20 cc. methanol and 3 g. potassium hydroxide, then poured into water. The dihydrocarveol was extracted with naphtha. On distilling off the naphtha under vacuum, the dihydrocarveol was recovered as an oil with an odor reminiscent of carveol.

Five grams of dihydrocarveol diluted with an equal amount of naphtha was stirred with a mixture of 4 g. sodium dichromate, 19 cc. of water and 5 g. concentrated sulfuric acid for one hour. The naphtha layer was then separated, washed with water, then dilute alkali and again with sodium bicarbonate. The naphtha was then distilled off and the ketone examined by infrared spectrophotometric analysis. Comparison of its spectrogram with that of an authentic sample of dihydrocarvone showed that it was practically pure dihydrocarvone. Thus, the alcohol is established as dihydrocarveol and the ester as dihydrocarvyl acetate. As there were no purification processes between the crude dihydrocarvyl acetate and the dihydrocarvone, the purity of the ketone stands in evidence of the lack of by-products formed on the pyrolysis of dihydrosobreryl diacetate. The ketone showed $[\alpha] = +12.5°$. Since the starting sobrerol had 71.5% of the optical activity possessed by optically pure sobrerol, the activity of the ketone from fully active sobrerol would be 17.5°. This compares well with the highest rotation reported in the literature for dihydrocarvone, $[\alpha]_D = -17.7°$ for the levo optical isomer.

The carveols prepared from sobrerol according to this invention are a mixture of cis- and trans-forms with the transform present to the extent of about twice the cis-. These carveols display only slight rotation even if prepared from fully active sobrerol, and so are largely racemized. On the other hand, the dihydrocarveols retain the configurations corresponding to the starting dihydrosobrerol, and they are not racemized.

Although there is shown in Example 6 the hydrogenation of sobrerol with platinum oxide catalyst, it will be appreciated that hydrogenation with other catalysts is feasible and the particular catalyst used determines the particular stereo configuration obtained at the 1-position. Thus, hydrogenation of the double bond in sobrerol may theoretically produce two dihydrosobrerols depending upon whether the methyl group at the 1-position in the resulting dihydrosobrerol is cis- or trans- with respect to the isopropyl group. We have found that whereas hydrogenation with platinum oxide gives predominantly one form of dihydrosobrerol hydrogenation using a nickel catalyst yields predominantly the opposite form. Consequently, there is opportunity for establishing the relative positions of methyl and isopropenyl groups in the resulting dihydrocarvyl esters during the hydrogenation of the two easily available sobrerols since these relative positions of these groups will be maintained in forming the dihydrocarveols and their esters. From these stereospecific forms of the dihydrocarveols, the corresponding cis- and trans-carvomenthols and carvomenthones can be produced without resort to the expensive and unsatisfactory methods for preparation of these pure stereospecific forms as known in the prior art.

As used herein, the term "acyloxy exchange reaction" is meant an exchange reaction by which one acyloxy group is replaced by another such as in acid and ester exchange reactions.

Having described the invention, what is claimed is:

1. The process which comprises heating a diester of a dihydric alcohol selected from the class consisting of sobrerol and dihydrosobrerol esterified with carboxylic acids at a temperature sufficient to split off the elements of a carboxylic acid from the 8 and 9 positions.

2. The process of claim 1 in which the process is conducted in the liquid phase.

3. The process of claim 1 in which the process is conducted in the vapor phase.

4. The process of claim 1 in which the diester is a diester of sobrerol.

5. The process of claim 4 in which the diester is sobreryl diacetate.

6. The process of claim 1 in which the diester is a dihydrosobreryl diester.

7. The process of claim 1 in which the diester is dihydrosobreryl diacetate.

8. The process which comprises heating a diester of sobrerol esterified with carboxylic acids at a temperature sufficient to split off the elements of a carboxylic acid and saponifying the carvyl esters thus formed to produce carveols therefrom.

9. The process which comprises heating a diester of a dihydrosobrerol esterified with carboxylic acids at a temperature sufficient to split off the elements of a carboxylic acid and saponifying the dihydrocarvyl ester thus formed to produce dihydrocarveol therefrom.

10. The process of claim 9 where the dihydrosobreryl diester is a dihydrosobreryl diacetate.

11. Process of claim 9 where the dihydrosobreryl diester is optically active.

12. The process which comprises hydrogenating sobrerol employing a nickel catalyst, esterifying the dihydrosobrerol thus formed with carboxylic acids and heating the resulting diester at a temperature sufficient to eliminate the elements of a carboxylic acid from the 8 and 9 positions.

13. The process which comprises hydrogenating sobrerol employing a platinum oxide catalyst, esterifying the dihydrosobrerol formed with carboxylic acids and heating the resulting diesters at a temperature sufficient to eliminate the elements of a carboxylic acid from the 8 and 9 positions.

14. In a process for producing dihydrocarvone, the steps comprising pyrolyzing a diester of a dihydrosobrerol, saponifying the dihydrocarvyl ester thus formed and oxidizing the dihydrocarveol to dihydrocarvone.

15. The process which comprises heating a lower hydrocarbon carboxylic acid-diester of an alcohol selected from the class consisting of sobrerol and dihydrosobrerol at a temperature sufficient to split off the elements of carboxylic acid from the 8 and 9 positions.

16. The process of claim 1 in which the heating is carried out at reflux temperatures at atmospheric pressure.

References Cited in the file of this patent

Blumann et al.: J. Chem. Soc. (London) 1952, pp. 4420–4422.

Simonsen et al.: "The Terpenes" (1952), vol. I, pp. 281, 283, 297, vol. III pp. 511–512.